United States Patent [19]

Ace

[11] Patent Number: 4,679,918

[45] Date of Patent: Jul. 14, 1987

[54] OPHTHALMIC GLASS/PLASTIC LAMINATED LENS HAVING PHOTOCHROMIC CHARACTERISTICS AND ASSEMBLY THEREOF

[76] Inventor: Ronald S. Ace, 5200 J. Philadelphia Way, Lanham, Md. 20706

[21] Appl. No.: 663,914

[22] Filed: Oct. 23, 1984

[51] Int. Cl.$^4$ .......................... G02C 7/02; G02C 7/10
[52] U.S. Cl. .................... 351/163; 350/417; 351/159; 351/166; 351/177
[58] Field of Search ........ 350/409, 417, 354; 351/159, 163, 166, 177; 65/30.11; 264/1.7, 1.8

[56] References Cited

U.S. PATENT DOCUMENTS

| | | |
|---|---|---|
| T739,939 | 9/1965 | Christensen .................... 350/319 |
| 2,092,789 | 1/1936 | Tillyer ............................. 351/159 |
| 2,263,249 | 9/1939 | Rogers ............................ 351/163 |
| 2,287,546 | 2/1938 | Binda ................................. 18/59 |
| 2,340,109 | 1/1944 | D'Alello .......................... 260/42 |
| 2,356,250 | 12/1937 | Land ................................ 156/99 |
| 2,361,589 | 8/1940 | Bennett et al. ................. 351/172 |
| 2,363,422 | 7/1942 | Hutchings ............................ 2/14 |
| 2,409,356 | 4/1944 | Hutchings ...................... 351/165 |
| 2,453,665 | 12/1943 | Kropa .............................. 351/159 |
| 2,596,863 | 8/1949 | Moulton et al. ................. 260/27 |
| 2,788,306 | 4/1957 | Cox et al. ....................... 154/139 |
| 2,962,471 | 11/1960 | Lang et al. ..................... 260/45.4 |
| 3,258,356 | 2/1962 | Caldwell et al. ................. 117/72 |
| 3,406,086 | 3/1965 | Foster .............................. 161/183 |
| 3,471,356 | 9/1964 | Kolb et al. ...................... 161/160 |
| 3,508,987 | 5/1964 | Burkley et al. .................. 156/99 |
| 3,533,897 | 6/1967 | Robbins, Jr. et al. .......... 161/117 |
| 3,551,344 | 12/1970 | Gardlund et al. ............... 252/300 |
| 3,574,030 | 7/1968 | Callander et al. .............. 156/244 |
| 3,582,455 | 6/1968 | De Lap et al. .................. 161/165 |
| 3,657,057 | 4/1972 | Shorr et al. ...................... 156/99 |
| 3,771,858 | 11/1973 | Bivens ............................ 351/159 |
| 3,808,077 | 4/1974 | Rieser et al. ..................... 156/99 |
| 3,922,327 | 11/1975 | Howden ............................. 264/1 |
| 3,970,362 | 7/1976 | Laliberte ........................ 351/163 |
| 3,982,822 | 9/1976 | Conder et al. .................. 350/452 |
| 3,998,531 | 12/1976 | Marzouk ......................... 351/166 |
| 4,143,181 | 3/1979 | Cahn et al. ..................... 427/195 |
| 4,161,560 | 7/1979 | Kienel ............................. 351/166 |
| 4,168,339 | 9/1979 | Kerko et al. .................... 351/166 |
| 4,174,240 | 11/1979 | Müller et al. ...................... 156/99 |
| 4,204,025 | 5/1980 | LeGrand et al. ................. 156/99 |
| 4,227,950 | 10/1980 | Spycher ...................... 351/166 X |
| 4,230,769 | 10/1980 | Goossens .......................... 156/99 |
| 4,243,719 | 1/1981 | Holmes ............................. 156/99 |
| 4,261,656 | 4/1981 | Wu ................................... 351/166 |
| 4,264,156 | 4/1981 | Spycher .......................... 351/166 |
| 4,264,658 | 4/1981 | Tobias et al. ..................... 428/35 |
| 4,268,134 | 5/1981 | Gulati et al. .................... 351/166 |
| 4,300,821 | 11/1981 | Mignen .......................... 351/163 |
| 4,311,762 | 1/1982 | Spycher et al. ................. 351/166 |
| 4,364,786 | 12/1982 | Smith, Jr. et al. ................ 156/99 |
| 4,417,790 | 11/1983 | Dawson e al. .................. 351/166 |
| 4,427,743 | 1/1984 | Katsuki et al. ................. 156/104 |

*Primary Examiner*—John K. Corbin
*Assistant Examiner*—Scott J. Sugarman
*Attorney, Agent, or Firm*—Jones, Tullar & Cooper

[57] ABSTRACT

A composite glass/plastic ophthalmic lens is disclosed. The lens consists of a thin layer of glass, preferably photochromic, adhered to the front of a plastic layer, by a highly elastic adhesive. The rear surface of the glass has a different radius than the front surface of the plastic so that the space between the lenses forms a tapered gap which is filled by the elastic adhesive. The edge thickness of the elastic adhesive is sufficient to insure that the increase in diameter of the plastic layer with respect to the diameter of the glass layer due to differences in the thermal expansion characteristic of the glass and the plastic will not damage the composite lens even over a temperature range greater than 300° F. The glass layer is shaped to have a power which compensates for differences in the index of refraction of the glass, adhesive and plastic layer, and which compensates for the optical powers produced by the tapered adhesive layer, so that the composite lens can be finished to prescription as though it were an all-plastic lens.

46 Claims, 14 Drawing Figures

OPHTHALMIC GLASS/PLASTIC LAMINATED LENS HAVING PHOTOCHROMIC CHARACTERISTICS AND ASSEMBLY THEREOF

BACKGROUND OF THE INVENTION

The present invention relates, in general, to ophthalmic lenses having photochromic properties, and more particularly to a combination lens fabricated from a glass and plastic laminate to provide a lens having the lightweight characteristics and other known advantages of plastic while at the same time having the superior photochromic properties presently available only in glass lenses.

Photochromic glass is described in U.S. Pat. No. 3,208,860, which defines such glass as having the capability of changing color when exposed to certain types of radiation and then returning to its original color when the radiation is removed. Usually, such glass is sensitive to ultraviolet radiation, although it may also be sensitive to other wavelengths. The reversible optical property imparted to glass in accordance with U.S. Pat. No. 3,208,860 is achieved by incorporating silver halide crystals into the glass. As explained in the patent, the mechanism of photochromic color change is based on the fact that the submicroscopic silver halide crystallites darken under the action of actinic radiation to reduce the optical transmittance of glass. When the source of actinic radiation is removed, the crystallites return to their original color state, restoring the optical transmittance to its original level. This sequence of darkening and fading can be repeated indefinitely without fatigue or loss of photochromic properties.

As pointed out in U.S. Pat. No. 4,168,339, the most extensive application for photochromic glass, to the present time, has been in the fabrication of ophthalmic lenses, both as prescription lenses and as non-prescription sunglasses. Because the incorporation of photochromic materials in such lenses represents compromises made between these characteristics and desired ophthalmic properties, extensive research has continued in order to try to provide a glass demonstrating improved photochromic behavior, while still retaining the other physical attributes demanded in the production of ophthalmic lenses. One problem in particular has been the fact that because the photochromic effect is caused by the absorption of atinic radiation by photochromic particles in the glass itself, the light transmittance of a darkened photochromic specimen is related in part to its thickness. Thus, where other parameters are held constant, a thicker sample of photochromic glass will normally get darker than a specimen of thin dimensions. This creates some problems in ophthalmic lenses where the grinding and polishing required to conform the lens to a desired prescription results in complex variations in thickness throughout the lens, and thus produces variations in the darkness of the lens.

Photochromic glass lenses have met with considerable market acceptability because of the advantages of a color-changeable ophthalmic lens and because glass lenses have a high degree of hardness and scratch resistence, are capable of surviving wide temperature extremes and frequent temperature cycling, and do not change significantly with age. However, glass is very heavy when compared to plastic both in prescription and non-prescription lenses. As a result, plastics have increasingly replaced glass as the material of choice for ophthalmic lenses since they cause less discomfort to the wearer, and this permits the use of lenses of greater area or diameter. The majority of patients now prefer and purchase lightweight plastic prescription lenses, whereas the vast majority of those who still purchase glass lenses do so because they want the photochromic properties now available only with glass.

Other advantages of plastic lenses are that they have a high clarity, can be dyed or tinted easily, machined easily and are relatively stable. Of course, plastic lenses do have certain drawbacks; for example, they do not possess the surface hardness of glass and thus are more susceptible to scratching. Furthermore, they have a very high thermal expansion and exhibit a greater degree of flexibility than glass, making precision optical polishing difficult, and often resulting in optical abberations, i.e., changes in the characteristics of a lens from its center to its pheriphery.

Numerous attempts have been made to produce photochromic articles from plastic materials, as exemplified by U.S. Pat. No. 3,551,344 which discloses a method of incorporating photochromic organic compounds in vinyl-type polymeric resin materials to form a photochromic plastic article. However, products such as this have not been practical for use as ophthalmic lenses because they have succumbed to fatigue of the color-reversible material relatively quickly, sometimes because the photochromic compounds were chemically incompatible with the plastic material and other times because these compounds decompose with exposure to water vapor or oxygen, both of which infuse slowly through plastic materials. The result has been that the photochromic properties that could be incorporated into plastic materials have disappeared in a relatively short time, so that these attempts have not been considered to be successful.

Many attempts have been made to produce a composite lens of glass and plastic wherein a glass layer is either buried within the plastic or is provided on its surface, the plastic being clear and the glass being photochromic. Although glass-plastic laminates have been successfully used in fields such as safety glass and structural glass, where the plastic layer is essentially a coating on a main glass body, the problems in forming glass-plastic composite ophthalmic lenses have been virtually insurmountable. Problems such as delamination, incomplete bonding, stress-induced birefringence, high sensitivity to temperature changes, and the like, have prevented the successful production of a glass-plastic ophthalmic lens that would incorporate all of the positive features of a glass lens, such as hardness, scratch resistance, rigidity, and photochromic properties, as well as the desirable properties of plastic, such as its light weight, its ability to receive dyes and tints easily, and the like. The principal difficulty has been found to be the wide disparity in the thermal expansion of glass with respect to plastic, for glass has a thermal expansion of approximately 5 parts per million per degreee centigrade, whereas the coefficient of expansion for optical plastic is on the order of up to 150 PPM/° C. at higher temperatures (and less than 80 at low temperatures). This difference in coefficient of expansion produces a significant difference in the mechanical expansion of a plastic layer with respect to a glass layer in a laminated lens. Where the glass layer is relatively thin with respect to the plastic layer in order to take advantage of the weight differential of the materials, such a difference in expansion effectively prevents its use as an ophthalmic lens. For example, if a three inch diamter ophthalmic glass/plastic laminate is exposed to boiling water, as would be the case if a tint or a dye were to be applied to a pair of glasses, the difference in the coefficients of expansion of the two materials, would result in a 0.034 inch difference in the diameters of the two laminates, causing the plastic to protrude 0.017 or more inches past the glass lens around its perimeter. Such an expansion is more than adequate to break the adhesion between the lens laminates, with prior art laminations, or else to fracture one of the lens components.

Numerous attempts have been made to overcome the problems that have occurred in the production of a plastic-glass ophthalmic lens, but have been unsuccessful at least in part because the usual lamination procedure, using adhesives such as ultra-violet cured epoxies or any number of other clear adhesives, has been to apply the adhesive to the surface of one of the layers and then press the other layer onto it with sufficient pressure to mate the two layers as uniformly close together as possible. The bonding surfaces of the two layers are normally formed with nearly identical curves so that they fit closely together, with the adhesive being applied therebetween. This close mating, which has been on the order of 0.001 mm, sought to achieve the maximum strength of bonding to prevent delamination. However, in reality it has been found that the plastic lens layer will expand with respect to the glass either beyond the flexing limit of the plastic so that the plastic will fracture, or beyond the flexing limit of the glass so that the glass will fracture, or to the point where the adhesive bond strength will be exceeded so that its adhesion to one or the other of the surfaces will be lost, or to the point where the cohesive strength of the adhesive itself will be exceeded so that the adhesive fractures. Most laminating adhesives which perform well at high temperatures fail at low temperatures, due to the brittleness of the adhesive at such temperatures, or fail at high temperatures because the adhesive becomes soft and flows, leaving stretch blemishes, bubbles, and eventually delamination. Sometimes the adhesive itself has such a widely different thermal expansion characteristic than the glass or plastic layers that the adhesive forces itself to delaminate. Hot water or high humidity is often very damaging to adhesive bonds and is a major source of failures.

SUMMARY OF THE INVENTION

It is, therefore, an object of the present invention to provide an optical lens which has the lightweight characteristics of plastic, the hardness, rigidity, and scratch resistant characteristics of glass, and which may be either clear or provided with photochromic characteristics.

It is another object of the present invention to provide a glass-plastic laminated ophthalmic lens having photochromic characteristics which is extremely resistant to delamination and which exhibits the beneficial features of both glass and plastic lenses.

It is an object of the present invention to provide a composite glass and plastic lens of optical quality which incorporates a plastic blank which can be ground and polished in the conventional manner and which incorporates a relatively thin surface layer of glass adhesively secured to a surface of the plastic blank.

It is still another object of the present invention to provide a composite glass-plastic opthalmic lens having photochromic properties which is capable of withstanding wide temperature extremes, which provides enhanced optical characteristics and which provides improved shatter resistant safety to the wearer.

It is another object of the present invention to provide a lightweight plastic-glass laminated opthalmic lens in which the glass layer provides a nearly uniform photochromic characteristic as well as an improved optical characteristic to the plastic layer, the plastic layer being ground and polished to a desired prescription.

In accordance with the preferred form of the present invention, the problems encountered with prior art glass-plastic laminated optic or ophthalmic lenses is eliminated by adhesively securing to the front curved surface of a plastic lens blank a glass layer of nearly uniform thickness. The curvature of the back surface of the glass layer has a slightly larger radius of curvature than the radius of curvature of the front surface of the plastic lens. This difference of curvature produces between the adjacent surfaces of the two layers a radially tapered gap which increases in the axial direction of the lenses from a minimum value at the axial center of the two lens components to a maximum value at the peripheral edges thereof. This axial space, or gap, receives an adhesive layer which must be optically clear, highly elastic, substantially inert, and which must retain its characteristics over wide temperature and humidity ranges, while retaining the desired degree of adhesive and cohesive strength.

More particularly, the plastic lens layer may be any of the well-known plastics which have the optical clarity required for ophthalmic or other optical applications and which have the capability of being ground and polished or molded to desired prescriptions. Preferably, a material such as the diethelene glycol bis (allyl carbonate) monomer resin marketed under the trademark CR-39 by PPG Industries, Inc., Pittsburg, Pa., is used. The plastic layer may be thick enough to allow a suitable grinding and polishing operation for meeting desired prescriptions, if a so-called "semifinished" lens blank is to be produced. Alternatively, a finished plastic lens with the desired prescription may be laminated directly to the glass front, or an essentially plano plastic lens may be used if no prescription is required.

The glass layer is of a conventional optical quality glass preferably incorporating a higher-than-normal concentration of photochromic materials of the type described in the aforesaid U.S. Pat. No. 3,208,860. Photochromic silicate glasses of the type manufactured by Corning Glassworks, Corning, NY., under the trademark "Photogrey Extra," or phosphate photochromic glass of the type manufactured by Schott Glass Company are preferred.

The adhesive used to bond the two layers together may be any of the many silicone adhesives having characteristics similar to the physical properties of the adhesive sold under the trademark RTV-108 by the General Electric Corporation or that sold under the trademark 734 RTV by Dow Corning Corporation, or any of the many other one or two part silicone elastomers presently available. In the preferred form of the invention, a long chain silicone polymeric elastomer composed of polymethalphenylsiloxane plus silicone dioxide and acetoxysilane as a cross-liner with a tin catalyst (0.02%) is used, which adhesive is designated as product number V23-10 and is marketed by Perennator North America, Inc., of Spartanburg, S.C. This adhesive exhibits very high elongation characteristics over wide temperature extremes, demonstrates extreme optical clarity, has high adhesive and cohesive bonding strength, and is inert to most acids, bases and solvents, and, in addition, resists tinting dyes. Further, it is a one part adhesive which can be dispensed controllably in a production environment, which is an advantage over two part adhesive systems which have pot lives which can cause dispensing problems.

In such a composite lens, the photochromic glass layer may be of nearly uniform thickness (i.e., essentially plans), and is preferably between 0.5 and 2.0 mm thick. If the product is to be a semifinished blank, which is to be surfaced to prescription at some later time, the plastic lens blank, which is conventional, will have an initial thickness which will depend on its front curvature and upon the diameter of the lens, as is known in the art. This lens blank is capable of being surfaced by grinding and polishing on its back, or ocular, surface in accordance with the desired prescription. The curvature of the front surface of the plastic blank has a slightly smaller radius than the back, or adjacent, surface of the glass layer; for example, the plastic lens blank may have a front spherical curve of plus +6.50 diopter, while the rear curve of the glass may be −0.625 diopter. This produces a tapered gap between the glass and plastic layers which receives the adhesive layer. During assembly of the layers, adhesive material is placed between the glass and plastic, and pressure is applied to press these front and back layers together. The thickness of the gap, and the adhesive, at the center of the lens may be reduced to between 0 and 0.1 mm while the gap, or adhesive, thickness at the outer periphery of the composite lens may be between 0.3 and 0.5 mm for a 70 mm diameter lens.

Because the photochromic glass layer in the present invention is of relatively uniform thickness, when the composite lens is exposed to actinic radiation such as sunlight it will assume a nearly uniform darkness across the diameter of the lens, providing a significant optical advantage over conventional photochromic prescription lenses. In such conventional lenses, a plus power spherical lens is thicker in the center than at the edges, while a minus power lens is thin at the center and thick at the edges. This causes standard glass photochromic lenses to turn dark very unevenly so that the patient either looks through a bright center portion and a dark peripherial portion, or else sees a dark central view with a relatively light peripheral view.

A further advantage of the present system is found in multifocal lenses. In accordance with present practice, multifocal lenses are produced using a bifocal element, for example, having high index glass without photochromic properties. This produces a clear bifocal "window" on the lens while the rest of the lens darkens, and this is not desirable. In accordance with the present invention, a bifocal element is adhered to the front surface of the glass layer to provide the multifocal property, but the glass layer still darkens evenly. Thus, even if the bifocal element is clear, the lens as a whole darkens, and the clear window is eliminated.

Because a larger proportion of the volume of the present composite lens is of a lower density lightweight plastic, especially in higher powered prescriptions, the resultant composite lens is extremely lightweight compared to a glass lens of comparable prescription power. Furthermore, the glass layer provides rigidity to the entire lens, allowing the plastic portion to be ground and polished much thinner than is possible with ordinary plastic lenses so that a composite lens may in many cases be as light or lighter in weight than a 100% plastic lens. This rigidity also significantly reduces flexing of the plastic layer during the grinding and polishing operation. Such flexing has presented difficulties in grinding and polishing prior all-plastic lenses and has effectively limited the thinness to which such lenses can be ground, since the flexibility of prior plastic lenses often results in optical distortions or aberrations in the finished lens.

Because the major part of the finished composite lens is plastic, it can be easily tinted or dyed in accordance with normal procedures to produce fashion tinting or to produce even darker prescription sunglasses, whereas glass lenses will not accept a tint. Further, the composite lens can be surfaced and edge ground in the usual ways, using conventional equipment designed to generate glass lenses, edge glass lenses, and polish plastic lenses. Because of the improved rigidity of the lens, prescriptions can be ground to much greater accuracy and with less distortion than was previously possible with plastic lenses. Thus, even in special cases when a very small prescription power is called for, where the weight reduction over glass is lower than high power weight reductions, the laminated product is still preferred.

Although in the preferred form of the invention the adhesive layer is tapered outwardly from a minimum thickness at the center of the composite lens to a greater thickness at the periphery, it has been found than in some applications a uniformly thick layer of adhesive may be used, where the back surface of the glass layer has substantially the same radius of curvature as the front surface of the plastic layer. This produces a plano adhesive layer which has at its outer periphery a thickness great enough to accommodate the different expansions of the glass and plastic layers. This thickness, which is on the order of 0.4 mm for a lens of about 65 mm diameter, is much larger (by a factor of about 400) than has heretofore been thought practical, or even possible, in an optical quality lens, but has been found to produce a useful composite having the beneficial features of both glass and plastic.

In special prescription lenses, for example, lenses having on the range of a 12 diopter positive power, it has further been found that surprisingly beneficial results can be obtained through a reverse taper, where the center thickness of the adhesive layer is actually greater than its edge thickness, although it is necessary to maintain the gap at the peripheral edge of the composite at a thickness sufficient to accommodate the differences in the coefficients of expansion of the materials. The reverse taper in the adhesive layer for high positive power lenses has the effect of permitting a reduction in the edge thickness of the composite lens, thereby producing a lens which not only is cosmetically more desirable, but the thinner lens so produced may be lighter in weight than a corresponding all-plastic lens.

Because the adhesive material has a different index of refraction than either the plastic or the glass, the net power of the complex lens is altered by the materials, and that fact must be taken into account when calculating the curvatures of the surfaces of the lens blank layers in order to produce a specific prescription lens. An individual calculation of the optical correction needed when grinding and polishing each semifinished lens blank to take into account the effects of the various indices of refraction as well as the different base (front surface) curves of the glass and plastic layers and the rear curve of the glass layer would be possible, but would be quite tedious. If this calculation were to be required each time a composite lens is ground to prescription, the lens of this invention would present difficulties to the lens retailer. However, in accordance with the present invention, the base curves of the glass and plastic layers, the thickness of the glass layer, the back curve of the glass layer, and the resulting taper and thickness of the adhesive layer, are all selected in the semifinished lens so that the lens can be treated as though it was 100% CR-39 plastic. This allows a lens surfacer to grind and polish the composite lens using the same curvature mathematics and index of refraction relationships, the same machines, and the same tooling as are normally used for CR-39 plastic. If this compensation was not done, or was not possible, surfacing would be extremely difficult, and very impractical.

The composite lens of the present invention not only is improved optically over the prior art, but has been found to exceed the impact-resistance and shatter resistance requirements of the Food and Drug Administration for eyeglass lenses. Thus, the FDA requirements describe a steel ball impact test using a $\frac{5}{8}$ inch steel ball weighing approximately 0.56 ounce being dropped from a height of 50 inches upon the horizontal upper surface of a lens. Tests using a $\frac{7}{8}$ inch diameter ball weighing $2\frac{1}{2}$ to 3 times the standard weight were conducted on a lens constructed in accordance with the present invention, and the lens still easily passed the FDA safety requirements. Other tests, such as exposing the lens to extremely wide temperature extremes up to $+300°$ and down to $-100°$ F., submerging the lens in boiling water for three hours, submerging the lens for 10 minutes in 170° water containing a cleaning solution and subjecting the water to ultrasonic energy, have illustrated the durability and reliability of the lens, and its resistance to damage by exposure to a wide variety of chemicals and solvents. The adhesive is temperature stable to over 425° F., is stable in prolonged sunlight, and does not lose its adhesive qualities nor does it change colors with age, so that the material is suitable for optical use over long periods of time. Also tinting tests showed no leaching of the tint colors into the lamination gap (adhesive), thus allowing uniform tinting of the plastic layer, as required.

Because the metal halide materials which provide the glass with its photochromic characteristics can be incorporated in high concentrations, a glass having a thickness of about 0.4 to 1.0 mm can produce the dynamic color change characteristics of the extremely popular but much thicker "Photogrey Extra" lenses and "Photobrown Extra" lenses made by Corning Glass. Because the photochromic characteristics are available in very thin glass, the thickness required for the lamination of the present invention is not controlled by the absorption dynamics, but rather is dictated by the need to have the glass withstand the rigorous processing machinery of the existing ophthalmic industry as well as end user abuse.

Edger machines, which shape a lens to fit a particular eyeglass frame, for example, are particularly abusive to thin glass lenses, and a glass layer of less than 1.0 mm, either laminated to plastic or alone, will often crack during an edging process, particularly when the plastic layer has a low power and thus provides weak physical support. Because of this consideration, the center thickness of the glass used in the laminate of the present invention should be greater than 1.0 mm, and preferably should be between 1.2 and 1.4 mm. Since a weak prescription would normally be produced using a +6 diopter front glass base curve and a relatively thin plastic back layer, such a combination would especially require the added strength of glass with a center thickness of between 1.2 and 1.4 mm. Very high powered lenses with thick plastic backings can use a thinner glass layer, if so desired, due to the added mechanical strength of the thick plastic.

For the very first time a truly practical and extremely durable composite glass and plastic ophthalmic lens has now been achieved. This is a major breakthrough, solving a problem that has stymied the ophthalmic industry for many years and providing a solution which previous major research efforts have been unable to produce. Although glass and plastic have been laminated before, the results have not been acceptable for optics, and particularly not for ophthalmic use. Since plastic expands thermally about 30 times more per unit than glass, and since ophthalmic lenses are normally exposed to severe temperature extremes, prior attempts have resulted in failures such as delamination, glass breakage, plastic breakage, or discoloration. The present invention overcomes all of these problems and provides, in its preferred form, a lightweight glass and plastic composite photochromic prescription lens which is capable of withstanding wide temperature extremes without failure, can withstand exposure to intense and prolonged sunlight without deterioration and which produces uniform darkening across the entire lens rather than the uneven darkening present in normal photochromic prescription glass lenses. The composite lens has the scratch resistance of glass and the ground and polished completed lens may have essentially the same weight as a corresponding all-plastic lens, while also serving as a shatterproof safety lens that can be tinted like ordinary plastic lenses.

BRIEF DESCRIPTION OF THE DRAWINGS

The foregoing and additional objects, features and advantages of the present invention will become apparent from a consideration of the following detailed description of preferred embodiments of the invention, taken in conjunction with the accompanying drawings, in which.

DESCRIPTION OF PREFERRED EMBODIMENTS

Figure 1:
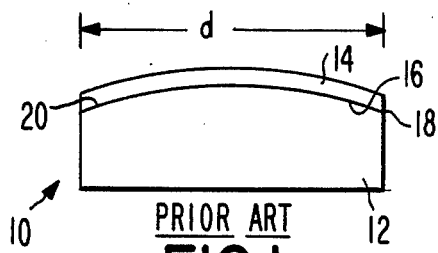
FIG. 1 is a diagrammatic illustration of prior art glass and plastic lens laminations.

The usual procedure in producing a lamination of two layers of material, particularly when seeking to bond a glass layer to a plastic layer in making ophthalmic lenses, has been to join two pieces having the same radius of curvature by means of an adhesive under pressure in order to mate them as closely and as uniformly as possible. This close proximity was thought to have been required, in prior lenses, in order to obtain the best possible bond strength, and the result is illustrated in FIG. 1. Thus, a prior art ophthalmic lens 10 is illustrated as having a semifinished plastic lens blank 12 forming the back, or ocular, side of the lens, and a glass layer 14 secured to the forward surface 16 of the plastic blank 12 by means of a suitable adhesive 18. As illustrated, the adhesive 18 is of uniform negligible thickness (on the order of 0.001 mm) across the diameter d of the lens 10. The rear surface of the plastic blank 12 may be ground and polished in the normal way to produce a prescription lens or, if desired, the blank 12 may simply be a preformed prescription or nonprescription lens. In any case, the front surface 6 of the blank 12 is selected to have the same curvature as the rear surface 20 of the glass layer 14 so that by an even application of force during the assembly procedure, the layer of adhesive 18 attains a uniform negligible thickenss.

In producing lenses in accordance with prior art methods, it has been found that such an arrangement usually results in delamination of the lens components, breakage of either the glass or the plastic, or other undesired results. Such problems usually result from the differential expansion which occurs when laminated lenses are exposed to wide variations in temperature. This is because the thin layer of adhesive typically provided between the two layers of such a lamination cannot stretch or yield the distance required by the physical movement of the plastic lens with respect to that of the glass lens, thus producing very large forces on the adhesive material, which cause it to delaminate. Such delamination creates opaque areas and streaks around the edge of the lens, which are not acceptable in optical devices.

Because of the strict requirements in ophthalmic lenses for clarity and because of the need to shape such lenses to meet a wide variety of prescriptions, prior art solutions to the problem of producing a photochromic plastic lens turned to methods which involve embedding glass particles in the plastic material, embedding a very thin layer of glass in the plastic, developing special adhesives, or attempting to develop entirely new photochromic materials that would be compatible with plastics. However, none of these approaches have resulted, to date, in a photochromic lens having the lightweight characteristics of plastics and which would meet the requirements for successful marketing of such a lens. Such requirements include long life, resistance to chemical damage, ability to accept dyes and tints, and the like, outlined hereinabove. All of the prior attempts to solve the problem overlooked the illusive, yet simple and extremely effective method and lens structure of the present invention illustrated in diagrammatic form in FIG. 2.

Figure 2:
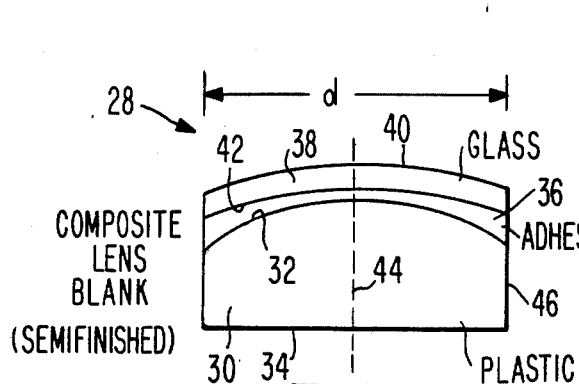
FIG. 2 is a diagrammatic illustration of a composite semifinished lens blank constructed in accordance with a preferred form of the present invention.
Figure 3:
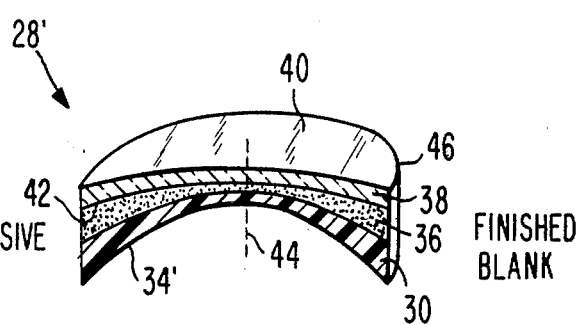
FIG. 3 is a diagrammatic cross-sectional view of a finished lens blank of negative power constructed in accordance with the preferred form of the present invention.

As shown in FIG. 2, the composite lens 28 of the present invention includes a plastic lens blank 30 which is of generally conventional configuration; preferably it is a standard "CR-39" plastic lens blank. As illustrated, the lens is semifinished, in that it has a curved face or front surface 32 which is finished to a selected radius of curvature while the rear or ocular surface 34 is unfinished. The surface 34 is adapted to be ground and polished to a spherical and/or cylindrical curvature, in the manner illustrated in FIG. 3 at surface 34; in accordance with a desired ophthalmic prescription. The lens blank 30 may have any desired diameter d, but conventionally such blanks are supplied in a variety of standard sizes or diameters, with each diameter being provided in several standard base (or front surface) curves, such as zero (flat), 2, 4, 6, 8, and 10 Diopter for the front surface 32, a Diopter being approximately the inverse of the focal length, in meters.

To form the composite lens line 28, the front surface 32 of the plastic blank 30 is covered by a layer 36 of an optically clear elastomeric material having a sufficiently high adhesive bonding strength to provide bonding with the plastic blank 30 and a sufficiently high cohesive strength to resist separation under conditions of mechanical stress. Suitable elastomeric materials are the permanently elastic, long chain polymeric silicone adhesives, such as that sold as V23-10 silicone sealant by Perennator North America, Inc. This material is a one part RTV silicone composed of polymethalphenylsyloxane plus silicone dioxide and acetoxysilane as a cross-linker, with a tin catalyst (0.02%). This material uses an acetate cure system, and thus reacts with atmospheric moisture to become a strong, flexible elastomer which remains crystal clear. This material typically exhibits the properties and performance characteristics illustrated in table A as follows:

| TYPICAL PROPERTIES AND PERFORMANCE CHARACTERISTICS | | |
|---|---|---|
| TEST METHOD | CHARACTERISTIC | V23-10 |
| ASTM D-2240 | Shore A Hardness | 20 |
| ASTM D-412 | Tensile Strength | 200 psi |
| ASTM D-412 | Elongation | 400% |
| Average of Colors | Specific Gravity | 1.03 |
| ASTM D-624 (Die B) | Tear Strength | 25 ppi |
| TT-S-001543A, 3.5.9 | Peel Strength-Glass | 40 ppi |

-continued

TYPICAL PROPERTIES AND PERFORMANCE CHARACTERISTICS

| TEST METHOD | CHARACTERISTIC | V23-10 |
| --- | --- | --- |
|  | Peel Strength-Concrete | 40 ppi |
| TT-S-001543A, 3.2 | Sag, or Slump | Nil |
| TT-S-001543A, 3.3 | Package Stability, 80° F. | 12 mos. |
| TT-S-001543A, 3.4 | Toxicity | Non-Toxic* |
| TT-S-001543A, 3.5.3 | Extrusion Rate | Conforms |
| TT-S-001543A, 3.5.5 | Weight Loss | 5% Max |
| TT-S-001543A, 3.5.6 | Tack Free Time | <1 Hour |
| Average Conditions | Tooling Time | Not Applicable |
| TT-S-001543A, 3.5.7 | Staining, Color Change | None |
| TT-S-001543A, 3.5.8 | Durability | — |
| Minimum 4.1 Safety Factor | Movement Capability | ±25% |
| ASTM D-877/D-149 | Dielectric Strength | 22 KY/mm |
| ASTM D-924/D-150 - At 1 MHZ | Dielectric Constant | 2.7 |
| ASTM D-924/D-150 - At 1 MHZ | Dissipation Factor | 0.002 |
| $\Omega \times CM$ | Volume Resistivity | $2 \times 10^{15}$ |
| List of Chemicals Available | Chemical Resistance | Excellent |
| Sun-Test ® Weather | Weatherability | No Cracking |
| Simulator of Hergeus, | After 6000 Hours | No Change |
| Hanau, W. Germany |  | In Hardness or Color |

*With Adequate Ventilation

An extremely important feature of the foregoing adhesive is that even in its uncured state, it is nontoxic, with adequate ventilation, and becomes quite inert after cure, and, thus, is suitable for use in eyeglasses. Further, the material exhibits a very low tensile strength, is resilient, and is capable of 400% elongation without destruction or permanent deformation. Further, the material exhibits a relatively high tear strength and excellent adhesiveness to a nonporous material such as glass, and after 6,000 hours of exposure in a sun test, the material showed no change in hardness or color.

The composite lens blank 28 is completed by a thin front layer 38 (FIG. 2) which is of conventional ophthalmic quality glass, preferably a silicate glass containing photochromic crystallites, as discussed hereinabove, although phosphate photochromic glass may also be used. The glass lens layer 38 includes a forward surface 40 and a back, or occular surface 42. The front and back surfaces are shown as being substantially parallel to each other, so that the lens 38 nominally has no power; i.e., is plano, although in a preferred form of the invention, different curvatures may be provided on the front and back surfaces to produce a slight minus, or negative, power, as will be described below. The lens 38 preferably is provided in substantially the same diameter sizes as the plastic lens blanks 30 and in a selection of front, or base, curvatures for each diameter size.

To produce the composite lens blank 28, the plastic lens component 30 is selected in a particular size (diameter) with a desired base curve for the front surface 32, and a matching glass lens component 38 is selected in the same diameter, but with a back curve (for the rear surface 42) that is different than that of surface 32. This difference in the radius of curvature for the two surfaces produces an outwardly tapered gap, or space, between the adjoining surfaces 32 and 42 which is filled by the adhesive 36. This causes the adhesive to be shaped so that it has its minimum thickness at the geometrical center of the lens, identified by axis 44, and its maximum thickness at the peripheral edge 36 of the lens. The diverging lens surfaces thus produce a continuously outwardly increasing gap between the plastic and glass layers 30 and 38.

In the assembly of the component parts of the composite lens 28, great care must be taken to properly align the centers of the two lens components 30 and 38 and to make sure that the front surface of the plastic lens 38 and the back surface of the glass lens 38 are spaced apart symmetrically so that there is an equal spacing around the entire periphery of the assembly. The uncured adhesive, which is sufficiently viscous to remain in place on the surface of the lens, is applied to the surface 32 or 42, and the two lens components are pressed together with sufficient pressure to bring the adjoining surfaces close together. It has been found that bubbles can be eliminated from the adhesive layer by applying pressure to one of the lens components with a repetitive circular movement, so that the center of one lens component traces a circular path around the axis of the other lens component as the two components are pressed together. This causes any bubbles in the adhesive material to dissipate completely, so that when the components are properly spaced apart, the axes aligned and the surfaces symmetrically spaced, the adhesive will be bubble-free and optically clear.

After this mechanical assembly, the adhesive is allowed to cure. The preferred adhesive is an air-curing material, but has been found to cure satisfactorily even when sandwiched between the glass and plastic layers, due to the slight porosity of the plastic lens material. Although this curing can take place at room temperature, it has been found desirable to provide curing at a slightly elevated temperature; for example, in the range of 110° to 140° F. The purpose of this increased temperature is not just to accelerate the curing process, but rather to cause the plastic lens blank to expand slightly so that it has a larger diameter during the curing process. Thereafter, when the lens is cooled to room temperature, and the lens blank returns to its room-temperature diameter, the adhesive is stressed slightly inwardly, as will be explained in greater detail below. This serves the purpose of increasing the range of temperatures which the elastic adhesive material can withstand without failure, since a temperature in the range of between 110° and 140° F. is at the midpoint of the physical movement of the plastic material when it is subjected to a temperature range of minus 85° F. to 280° F. By curing at a temperature at the midpoint of the mechanical motion, then, the composite lens has an increased range of temperature without failure than would be the case if curing took place at room temperature.

After the adhesive has cured, the semifinished lens blank can be ground and polished to prescription at a wholesale laboratory using conventional procedures and existing equipment. The following step-by-step wholesale laboratory procedure demonstrates the simplicity of finishing the composite lens to provide remarkably higher optical accuracy than was possible with an all-plastic lens.

(A) STOCK INVENTORY

Usual practices 0, 2, 4, 6, 8 and 10 base, 71 mm diameter) may be stocked in single vision blanks. Multifocals blanks may also be stocked as usual.

(B) SURFACING AND LAYOUT

Usual practices (spray-alloy, 3M tape, and blocking as usual).

(C) LENS GENERATING

Use glass diamond wheels, unless it is known for certain that the generating cuts will never penetrate to the glass surface (such as minus (−) powers only.) Plus (+) powers often demand front surface penetration and, therefore, require a glass diamond wheel. A universal approach is to use only glass cutting diamond wheels. Whenever a razor edged glass overhang is generated, it must be diamond hand stoned back, leaving only plastic to contact the fining and polishing pads.

(D) FINING AND POLISHING

Use standard plastic lens fining and polishing pads and plastic polish. Due to the increased rigidity of the new featherweight photochromic plastic-glass lenses, central and peripheral optical powers will be superior to standard plastic blanks. Standard edge thickness or center thickness can be reduced to as low as 1.5 mm with no optical deterioration.

(E) DEBLOCKING, CLEANUP, AND CHECKOUT

Usual practices. Less scratching will be encountered.

(F) FINISHING LAYOUT

Usual practices. Use any standard blocking method.

(G) EDGING

Use edger machines equipped with standard glass cutting diamond wheels. The standard "1.5 mm larger" roughing size should be maintained to eliminate chipping. Because of the front to back difference in materials of the laminated lens, an AIT finger-guided bevel location device is best, but standard bevel locator stop adjustments can also be used; especially if frame geometric center blocking is used. Hand beveling is permissible, as usual, on a glass diamond wheel. Front and back "touch off" is also done as usual on a glass diamond wheel.

(H) TINTING

Any tint bath using any usual tint. No delamination will occur even when extreme exposures are required. Tint will be uniform and will not tint into the adhesive. The plastic portion will take the tint as usual. Gradients are no problem. This new featherweight photochromic lens eliminates the need to vacuum coat tints and gradients on glass.

(I) DRILLING

Use a standard water- or oil-cooled diamond drill for the glass layer and continue to drill through the plastic using the same drill. Use of light pressure is always recommended for glass. Because the glass layer is very thin, this drilling is not a long process like thick ordinary glass prescriptions often are.

(J) GROOVING

Groove the edge of the lens as usual using a plastic grooving wheel. It may be grooved at any position behind the glass front layer (which is approximately 1 mm to 1.5 mm thick). Because the fronts of these new lenses are actually glass and grooving requires that the front of the lens slide along a guide, surface scratching will be eliminated.

(K) WEIGHT

The new lightweight photochromic lenses can be surfaced considerably thinner than conventional all-plastic lenses without introducing aberrations such as waves in the lens. The weight of the finished lens will vary with prescriptions, and will always be considerably less than glass. On high-powered prescriptions, where weight is most important, the composite lenses may be as light as 100% plastic lenses. High-powered lenses are especially attractive because the weight can be more than 50% less than a comparable all glass lens.

(L) SAFETY (DROP BALL TESTING)

Tests have been conducted as follows:

A −2.50 diopter spherical lens in 71 mm diameter was surfaced to 1.9 mm center thickness (having a glass layer thickness of less than 1.0 mm and a plastic layer thickness under 1.0 mm). The lens was drop ball tested using a ball almost three times heavier than the standard $\frac{5}{8}"$ ball, from 50 inches high, and falling on the thinnest portion of the lens. The glass front cosmetically cracked, and even shaled over an area almost 1 inch in diameter, but the lamination prevented any penetration to the reverse (ocular) side. The composite lens remained as one piece, and the ocular side was smooth and ejected no particles of either plastic or glass, in accordance with Food and Drug Administration recommendations.

The tapered shape of the adhesive 36 between the lenses 30 and 38 has several purposes, one of which is to provide the thinnest possible lens when the blank has been finished to the desired prescription. Although the exact peripheral thickness of the adhesive layer will depend, among other things, upon the diameter of the lens, it has been found that the adhesive layer preferably is between about 0 and 0.1 mm thick at the axis 44 and between about 0.2 to 0.4 mm thick at the peripheral edge 46 on a lens that is 70 mm in diameter. The glass layer 38 preferably is between 1.0 and 1.4 mm thick at its center, the required thickness of the glass depending primarily upon the desired durability throughout the ordinary prescription manufacturing processes. Preferably, a glass lens about 1.3 mm thick is used in order to keep overall weight of the composite lens as close as possible to the weight of an all-plastic lens. This goal is attainable since an all-plastic lens ordinarily has an optimum thickness of 2.2 mm, either at the center in a negative power lens or at the edge in a positive power lens. In the laminated lens 28', illustrated in FIG. 3, if the glass layer 38 is 1.3 mm thick, for example, and if the lens prescription requires the surface 34' to be ground down to substantially the adhesive layer 36, leaving only a very thin plastic layer 30 at the axis, the total thickness of the composite lens at the geometric center, or axis 44, will be substantially that of the glass lens alone. In such a circumstance, the total weight of the finished blank 28' will be very close to the same weight if not less than the weight of a properly finished all-plastic lens having a 2 mm minimum thickness. The reason that plastic lenses ordinarily cannot be surfaced much thinner than 2 mm is because plastic is relatively flexible, and the grinding process produces distortions and waves in a thin plastic blank which adversely affect the optical quality of the lens. However, in the composite lens of FIGS. 2 and 3 the rigid glass layer 38 supports the plastic and allows it to be surfaced to a minimum thickness much less than 2 mm.

Figure 4:
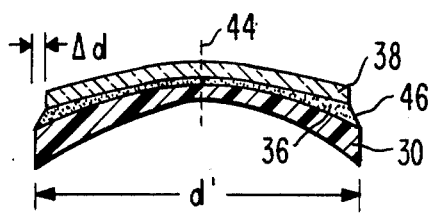
FIG. 4 is a diagrammatic illustration of the effect of high temperatures on the glass-plastic composite lens of FIG. 3.
Figure 6:
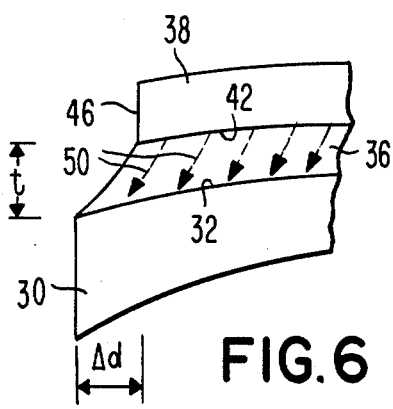
FIG. 6 is an enlarged view of an edge of the lens of FIG. 4 illustrating the effect of temperature on the adhesive joining the glass and plastic layers.
Figure 5:
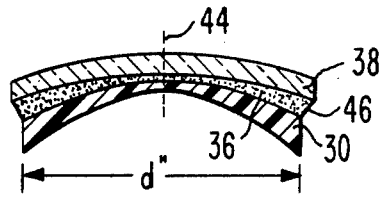
FIG. 5 is a diagrammatic illustration of the effect of very low temperatures on the lens of FIG. 3.

The importance of the spacing between the plastic lens 30 and the glass lens 38 is illustrated in FIGS. 4, 5, and 6, to which reference is now made. As previously explained, glass has a coefficient of thermal expansion on the order of 5 parts per million per degree centigrade, whereas an optical quality plastic material such as CR-39 resin has a coefficient of thermal expansion of over 143 PPM/° C. at temperatures over 200° F. When these dissimilar materials are bonded together by an adhesive, no problems arise as long as there is no change in temperature. However, if the temperature increases from its initial value, then the material which has the highest coefficient of expansion, in this case the plastic material 30 illustrated in FIG. 4, expands to a much greater extent than does the glass layer 38. Although the relative expansion of the two materials at the axis 44 is 0, the difference in mechanical movement of the two materials increases in a linear fashion as the distance from the axis increases, with the maximum difference being reached at the peripheral edge 46. The change in dimension of the glass may be considered to be negligible, but the diameter of the plastic lens increases a relatively large amount, to a value of d' which is greater than the original diameter d of the lens. In similar manner, if the temperature is reduced from the initial value, which may be the curing temperature for the adhesive, or may be some other reference point such as room temperature, the layer with the greatest coefficient of thermal expansion will decrease in size more than the decrease evidenced by the other material. Thus, as illustrated in FIG. 5, the plastic material 30 will decrease to a diameter d" which is less than the original diameter d of the lens.

The amount of change $\Delta d$ in the relative diameters of the two layers will depend upon the temperature change to which the lens is exposed, as well as the initial diameter of the lens. For a lens of approximately 70 mm in diameter, a change in temperature from room temperature to 212° F. can produce a difference $\Delta d$ of 0.042 inch between the glass and the plastic lens diameters, causing the plastic lens to protrude 0.021 inch past the glass lens all the way around the perimeter. Such a difference in expansion is sufficient to cause the destructive problems discussed hereinabove in prior art laminations. However, as illustrated in FIG. 6, the adhesive selected for the present invention, and the provision of a sufficient edge spacing of the layers, enables the lens of the present invention to tolerate wide temperature extremes without delamination.

Figure 7:
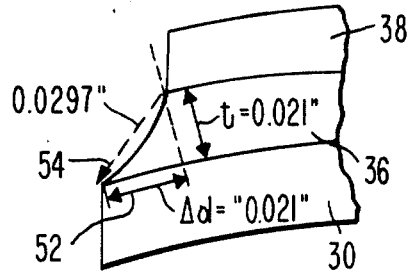
FIG. 7 is a diagrammatic illustration of the dimensional relationships in the lens of FIG. 6.

The expansion of the plastic lens 30 is linear from the center of the lens (not shown in FIG. 6) out to the lens edge 46. In the very center of the lens, there is no horizontal expansion, resulting in no relative movement. The amount of relative motion between the adjacent 32 and 42 increases linearly in a radial direction from the center, but this relative motion is accommodated by the elasticity of the adhesive 36 and by the increasing thickness of the adhesive layer, as illustrated by the dotted arrows 50 in FIG. 6. These arrows illustrate the increasing elongation of the adhesive which is required to maintain the bonds between the adhesive material and the surface 32 and 42, and thus the integrity of the laminated lens structure. The minimum thickness t of the adhesive layer required at the perimeter 46 of the lens is determined by the difference in the coefficients of thermal expansion of the layers 30 and 38, the diameter of the lens, the temperature range that the lens will encounter, and the maximum elongation permitted by the adhesive material 36. If, for example, the composite lens is constructed so that the thickness t of the adhesive 36 is 0.021 inch, and if the temperature change is such that the motion $\Delta d$ of surface 32 with respect to surface 42 is 0.021 inch, as illustrated by arrow 52 in FIG. 7, then a simple calculation reveals that the adhesive material bonded to the peripheral edges of surfaces 32 and 42 will have to stretch from its initial 0.021 inch thickness to a length of 0.0297 inch, as illustrated by arrow 54, to accommodate the relative motion. This represents a 141% elongation of the adhesive material. However, since the preferred V23-10 silicone adhesive discussed hereinabove is capable of 300% to 400% elongation without adhesive or cohesive failure, the composite lens 28 will not delaminate, nor will the glass or plastic fracture. Similar calculations along other points on the radius of the composite lens, where both the thickness of the adhesive and the relative motion of the adjacent surfaces are reduced, reveal similar results. Thus, the linearly increasing differential expansion of the two lens materials under even severe temperature changes is easily accommodated by the increasing minimum thickness of the adhesive so that the elongation characteristic of the adhesive material is not exceeded, the adhesive material is not damaged, and delamination occurs. Thus, the present structure provides the first reliable, lightweight ophthalmic lens capable of providing photochromic characteristics without the weight of previous all-glass photochromic lenses, while still providing the advantages of a glass surface. The face of the lens is highly scratch resistant but because the major part of the lens is plastic, it is very lightweight. Further, because the photochromic glass component of the composite lens is of nearly uniform thickness, it will assume a nearly uniform darkness across the lens when exposed to actinic radiation, thus providing improved optical characteristics over all-glass photochromic prescription lenses.

Figure 8:
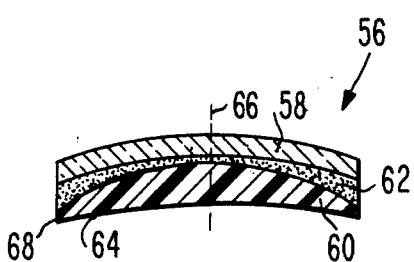
FIG. 8 is a diagrammatic cross-sectional view of a positive power finished prescription lens in accordance with the preferred form of the present invention.

Although the foregoing description has been in terms of a negative power lens, as illustrated in FIGS. 2-7, it should be understood that the invention is equally applicable to positive power lenses as illustrated in cross-section at 56 in FIG. 8. In that figure, a glass lens component 58 is mounted on a plastic lens blank 60 by means of an adhesive layer 62, in the manner described with respect to the embodiment of FIGS. 2-7. However, in this case the ocular surface 64 of the plastic lens 60 is ground in accordance with a prescription that requires the center portion of the lens to be generally thicker than the edge thickness at 68.

Figure 9:
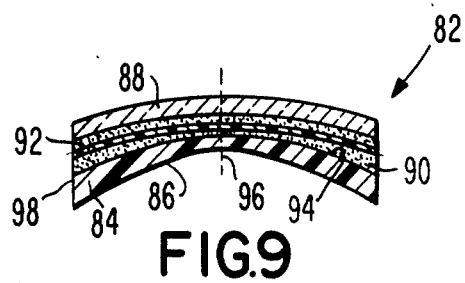
FIG. 9 is a diagrammatic cross-sectional view of a modified form of the composite lens of FIGS. 2-7.

The composite lens of the present invention is adaptable to a variety of modifications to provide ophthalmic lenses having additional compound optical properties. For example, the composite lens 82 illustrated in FIG. 9 includes a plastic lens component 84 having a finished ocular surface 86 secured to a photochromic front glass lens component 88 by means of an adhesive layer 90 in the manner illustrated in FIGS. 2 and 3. However, the lens 82 also incorporates a layer 92 of Polaroid material preferably in the form of a very thin sheet embedded in the adhesive 90 to provide a polarizing effect, in known manner. The composite lens 82 thus provides not only a photochromic capability, light weight, and tintability, but polarizes the light as well, thereby providing a highly desirable compound prescription sunglasses.

The polarizing layer may be provided simply by placing a layer of the adhesive 90 on the front surface 94 of the plastic lens 84, placing the thin Polaroid sheet 92 on the surface of the adhesive, and placing the remainder of the adhesive layer 90 on top of the Polaroid film. Thereafter, the glass 88 may be placed on the adhesive and the assembly pressed together to provide the desired adhesive layer thickness at the center 96 of the lens and a uniform tapering of the adhesive thickness from the center point to the peripheral edge 98 of the lens.

Additional, or different, laminates can also be incorporated in the adhesive layer to provide other desirable characteristics for the lens. For example, thin filters such as ultraviolet blocking films can be incorporated. Additionally, metallization or semitransparent mirror coatings, or special delicate multilayer interference coatings can be provided on one or both of the facing surfaces of the glass and plastic lens components so that these coatings are protected by the adhesive and by the plastic and glass layers. Such coatings and films are particularly desirable for use in prescription eyeglasses used at high altitudes, in the arctic or antarctic, and in similar adverse conditions.

Figure 10:
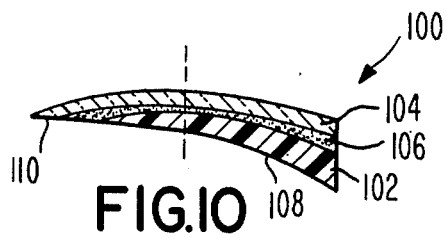
FIG. 10 is a diagrammatic view of a further modification of the composite lens of the invention.

Although the various lens blanks illustrated in FIGS. 2-9 show symmetrically finished surfaces on the ocular side of the lens, it should be understood that the requirements of different prescriptions will produce a variety of finished shapes, another example of which is illustrated in FIG. 10 by the composite lens 100. This lens includes a plastic layer 102 secured to a glass layer 104 by means of an adhesive 106 in the manner described with respect to FIG. 2. However, the ocular surface 108 of the plastic lens 102 is finished to provide a prism shape, which is not uncommon for ophthalmic lenses. When the lens 100 is so shaped, the glass layer 104 may extend beyond the edge of the plastic lens 102, as illustrated at 110. When this occurs, further processing of the lens requires the use of standard diamond wheels for edge grinding the lens to remove the glass protrusion. Thereafter normal plastic surfacing processes may be continued in order to fine and polish the lens.

In the normal production of eyeglasses, after grinding and polishing the ocular surface to provide the finished blank, which is normally circular, the blank is then edge shaped by conventional edge grinders to shape the blank to fit an eyeglass frame. Such edging is conventional, and needs no further explanation here, other than to note that in the present invention the glass layer provides rigidity to the plastic layer during the edging operation. Grooving the edge afterwards also causes no problems.

Because a typical plastic lens cannot be reliably surfaced if its thickness is reduced to much less than about 2.0 mm, as explained above, even a 100% plastic lens has a practical minimum weight limit. However, with a glass layer providing the additional rigidity to the plastic lens, it becomes possible to reduce the plastic thickness down to only a few tenths of a millimeter minimum thickness, while retaining a high optical accuracy; i.e., within about ±0.06 Diopter variance for both plus and minus lens powers. Since such thinness is possible, very light weight is also possible, and in some cases the laminated lens of the present invention may be lighter in weight than a comparable plastic lens having a minimum thickness of 2.0 mm. Thus, for example, if a 0.8 mm photochromic glass lens is laminated to a negative power plastic lens, where the center thickness of the plastic portion is ground down to 0.3 mm, the resultant glass-plastic laminated lens would actually be lighter in weight than a 2.0 mm plastic lens, and would be strong enough to pass all of the requirements for quality, including a drop ball test.

Although the glass, plastic and adhesive materials have very different indices of refraction, the composite lens may be constructed to exhibit a composite index which is identical to that of the plastic alone. The index of refraction for silicate glass is 1.523, the index for CR-39 plastic is 1.498, and the preferred adhesive V23-10 has an index of 1.4578, so each layer has a different optical effect, making it difficult to produce an accurate prescription. Construction is complicated by the fact that since the adhesive layer is tapered in the preferred form of the invention, it has a "power" which affects the overall power of the lens, and compensation for this effect also must be provided if an optically correct prescription lens is to be produced using standard lab procedures. Thus, it has been found that if a prescription calls for a particular ocular surface curvature for an all-plastic lens or an all-glass lens having a specified base (front surface) curve, it is necessary to provide compensation when producing that prescription using the composite lens of the invention. This can be done either by modifying the normal ocular surface curvature or by designing the appropriate compensation into all of the composite semifinished blanks prior to prescription manufacturing.

The calculations for optical compensation of the curvature of the ocular surface follow known optical principles, but are tedious, and subject to error. The most convenient method of compensation is to incorporate the necessary changes into the semifinished blank, so that the wholesale laboratory or eyeglass retailer responsible for grinding and polishing the semifinished blank to a finished prescription can treat the blank exactly as if it were all plastic. This avoids the need for the wholesaler or the retailer to recalculate the curvature needed to compensate a given lens, and allows them to treat all lenses, whether all-plastic or glass/plastic laminates, the same for purposes of finishing the ocular surfaces. The manner in which such compensation is obtained is illustrated in FIGS. 11 and 12.

Although all of the composite lenses illustrated in FIGS. 2-10 have shown the front glass layer as being a plano lens having its front and back surface curves of the same radius, it has been found necessary to construct the front lens of a glass/plastic composite with a power in order to compensate for the different indices of refraction of the materials and the slight power produced by the adhesive due to its tapered shape. Further, it is noted that even a nominally plano lens will have some power if it has curved front and back surfaces, and requires some curve compensation, as by making the back (ocular) surface differ from the front surface by, for example, about 0.02 diopter. Compensation for all of these variations is provided in the composite lenses of the present invention so that the ocular surface of the plastic layer can be ground and polished in accordance with known, conventional procedures to produce an accurate optical prescription.

Figure 11:
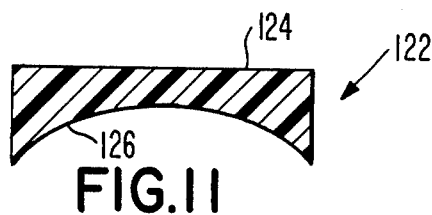
FIG. 11 is a diagrammatic illustration of a conventional all-plastic lens, having a plane front surface and a specified prescription power.
Figure 12:
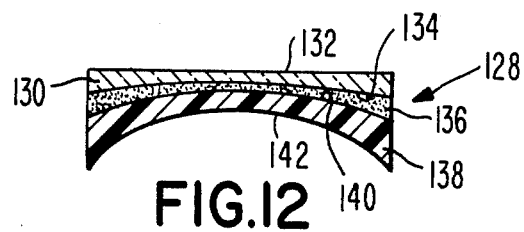
FIG. 12 is a diagrammatic illustration of a compensated composite glass/plastic lens according to the preferred form of the invention, having a plane front surface and the same ocular surface finish and the same power as the lens of FIG. 11.

For example, as illustrated in FIG. 11, if it is desired to provide an all plastic prescription lens with a given power, and a plastic blank 122 with a plane front surface 124 is selected, the ocular surface 126 is simply ground to the desired curve, for example −5.64D. However, if a composite semifinished blank 128 (FIG. 12) having a glass layer 130 with a plane front surface 132 and a rear glass surface 134, an adhesive layer 136, and a rear plastic layer 138 having a front surface 140 and an ocular surface 142 is to be finished to the same power (i.e., −5.64D), then ocular surface 142 would have to be finished to a different curvature than that of surface 126 to achieve the same overall lens power, unless compensation measures are incorporated in the lens. It has been found that the lens blank 128 can be treated as an all-plastic lens and be surfaced in the same way to produce the desired net power if it is constructed with the following dimensions:

| Example I (0 Base) | |
|---|---|
| LENS DIAMETER (mm) = | 71 |
| Glass Base Curve (front surface) = | 0.00 D; |
| Glass Back Curve = | −0.31 D |
| Plastic Front Curve = | +0.50 D; |
| Plastic Back Curve = | −6.00 D |
| Glass (center) and Edge Thickness = (1.10) mm = | 1.37 mm |
| Adhesive (center) and Edge Thickness = (0.13) mm = | 0.36 mm |
| Plastic (center) and Edge Thickness = (0.77) mm = | 7.62 mm |
| Total (center) and Edge Thickness = (2.00) mm = | 9.35 mm |
| Final Power, Composite Lens = | −5.64 |

In similar manner, a wide range of stock composite semifinished lens blanks can be produced, all compensated so that they can be finished by a wholesaler or retailer to a desired prescription, as if they were 100% plastic. Examples of such lenses having standard base curves of 2, 4, 6, 8, 10 and 12 diopters are illustrated below:

| Example II (2 Base) | |
|---|---|
| LENS DIAMETER (mm) = | 71 |
| Glass Base Curve (front surface) = | +.88 D |
| Glass Back Curve = | −2.11 |
| Plastic Front Curve = | +2.25; |
| Plastic Back Curve = | −6.00 |
| Glass (center) and Edge Thickness = (1.10) mm = | 1.38 mm |
| Adhesive (center) and Edge Thickness = (0.13) mm = | 0.18; |
| Plastic (center) and Edge Thickness = (0.77) mm = | 0.72; |
| Total (center) and Edge Thickness = (2.00) mm = | 7.20 mm |
| Final Power, Composite Lens = | 3.87 D; |

| Example III (4 Base) | |
|---|---|
| LENS DIAMETER (mm) = | 71 |
| Glass Base Curve (front surface) = | +3.90 D |
| Glass Back Curve = | −4.12 |
| Plastic Front Curve = | +4.25 D |
| Plastic Back Curve = | −7.00 |
| Glass (center) and Edge Thickness = (1.10) mm = | 1.38 mm |
| Adhesive (center) and Edge Thickness = (0.13) mm = | 0.18; |
| Plastic (center) and Edge Thickness = (0.72) mm; = | 4.40 mm |
| Total (center) and Edge Thickness = (2.00) mm = | 6.12 mm |
| Final Power, Composite Lens = | 2.89 D; |

| Example IV (6 Base) | |
|---|---|
| LENS DIAMETER (mm) = | 71 |
| Glass Base Curve (front surface) = | +5.96 D |
| Glass Back Curve = | −6.15 D |
| Plastic Front Curve = | +6.25 D |
| Plastic Back Curve = | −8.00 D |
| Glass (center) and Edge Thickness = (1.10) mm = | 1.36 mm |
| Adhesive (center) and Edge Thickness = (0.20) mm = | 0.34 mm |
| Plastic (center) and Edge Thickness = (0.70) mm = | 3.23 mm |
| Total (center) and Edge Thickness = (2.00) mm = | 4.92 mm |
| Final Power, Composite Lens = | −1.87 D |

| Example V (6 Base - Modified to Produce + Power) | |
|---|---|
| LENS DIAMETER (mm) = | 71 |
| Glass Base Curve (front surface) = | +5.96 |
| Glass Back Curve = | −6.15 D |
| Plastic Front Curve = | 6.25 D |
| Plastic Back Curve = | −5.00 D |
| Glass (center) and Edge Thickness = (1.10) mm = | 1.36 |
| Adhesive (center) and Edge Thickness = (0.20) mm = | 0.34 |
| Plastic (center) and Edge Thickness = (1.97) mm = | 0.30 |
| Total (center) and Edge Thickness = (3.27) mm = | 2.00 mm |
| Final Power, Composite Lens = | +0.97 D |

| Example VI (8 Base) | |
|---|---|
| LENS DIAMETER (mm) = | 71 |
| Glass Base Curve (front surface) = | +8.00 D |
| Glass Back Curve = | −8.18 D |
| Plastic Front Curve = | +8.26 D |
| Plastic Back Curve = | +5.00 |
| Glass (center) and Edge Thickness = (1.10) mm = | 1.38 mm |
| Adhesive (center) and Edge Thickness = (0.22) mm = | 0.34 mm |
| Plastic (center) and Edge Thickness = (4.89) mm = | 0.30 mm |
| Total (center) and Edge Thickness = (6.21) mm = | 2.02 mm |
| Final Power, Composite Lens = | +3.06 D |

| Example VII (10 Base) | |
|---|---|
| LENS DIAMETER (mm) = | 65 |
| Glass Base Curve (front surface) = | +10.00 D |
| Glass Back Curve = | −10.18 D |
| Plastic Front Curve = | +10.25 D |
| Plastic Back Curve = | −5.00 D |
| Glass (center) and Edge Thickness = (1.10) mm = | 1.36 mm |
| Adhesive (center) and Edge Thickness = (0.25) mm = | 0.34 mm |
| Plastic (center) and Edge Thickness = (6.68) mm = | 0.30 mm |
| Total (center) and Edge Thickness = (8.03) mm = | 2.00 mm |
| Final Power, Composite Lens = | +5.20 D |

| Example VIII (12 Base) | |
|---|---|
| LENS DIAMETER (mm) = | 65 |
| Glass Base Curve (front surface) = | +12.07 D |
| Glass Back Curve = | −12.22 D |
| Plastic Front Curve = | +12.25 D |

-continued

| | |
|---|---|
| Plastic Back Curve = | −4.00 D |
| Glass (center) and Edge Thickness = (1.10) mm = | 1.37 mm |
| Adhesive (center) and Edge Thickness = (0.29) mm = | 0.35 mm |
| Plastic (center) and Edge Thickness = (10.98) mm = | 0.32 mm |
| Total (center) and Edge Thickness = (12.37) mm = | 2.03 mm |
| Final Power, Composite Lens = | +8.25 D |

In the foregoing examples, all of the calculations are referenced to an index of 1.53.

In the examples, as well as in the description of preferred embodiments, the adhesive layer between the glass and the plastic layers has been tapered with a thin central, or axial, portion where little or no mechanical motion occurs under temmperature change conditions, to a relatively thick peripheral edge portion, where significant relative motion occurs. However, it has been found that in some circumstances, it is possible to utilize a thick adhesive layer that is not tapered; i.e., has the same thickness at the center as it has at the edge. As long as the thickness is great enough at the peripheral edge to accommodate the relative motion of the glass and the plastic layers, such a nontapered adhesive layer will function to provide a composite lens, thus allowing a thin photochromic layer of glass to be laminated to a plastic back layer. Such an arrangement is not preferred, however, particularly in prescription lenses, because it results in a thick center of the lens, thereby eliminating some of the advantages of a composite lens.

It has further been discovered that in some unusual situations, for example in a very high plus power lens, it may be advantageous to provide a composite lens in which the adhesive layer has a reverse taper, so that it is thicker in the center than at the edges. This has the beneficial effect of reducing the edge thickness of the composite compensated lens, which is desirable from a cosmetic as well as a weight standpoint.

Figure 13:
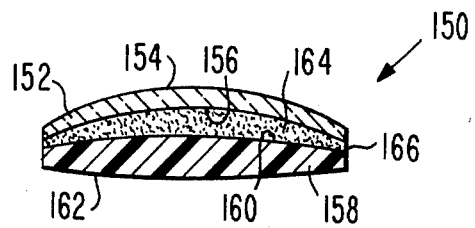
FIG. 13 is a diagrammatic illustration of a high plus power compensated composite lens having a reverse-tapered adhesive layer.

A reverse taper is provided in an unusual high plus power lens 150, which is illustrated in FIG. 13. Lens 150 includes a front glass lens layer 152 having a front surface 154 and an ocular surface 156. A plastic layer 158 having a front surface 160 and an ocular surface 162 is spaced from the glass layer and is adhered thereto by an adhesive 164. The adhesive layer spaces the adjacent glass and plastic surfaces 156 and 160 sufficiently to insure the integrity of the composite lens 150 under severe temperature variations. To accomplish this, the peripheral edge 166 of the adhesive must be sufficiently thick to accommodate the relative motion of the glass and plastic layers during changes in temperature, as explained hereinabove.

Figure 14:
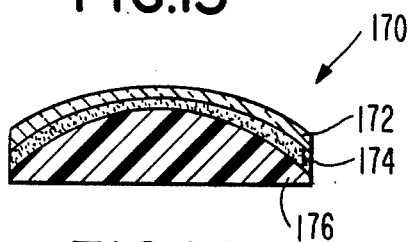
FIG. 14 is a diagrammatic illustration of a high plus power compensated composite lens having the preferred adhesive taper.

The requirement for a high plus power for the lens 150 requires the plastic layer to be very thick at its center. As illustrated in Example VIII, above, and in FIG. 14, a suitable composite lens 170 can be constructed using a thin-centered glass layer 172, a thin-centered adhesive layer 174, and a thick-centered plastic layer 176, but where this is done, a relatively thick peripheral edge results. This is caused by the need to compensate for variations in the index of refraction of the materials and for the power of the adhesive layer. But, it has been found that by reversing the taper of the adhesive in the manner shown in FIG. 13, the total thickness of the lens as well as the edge thickness can be reduced, thus also reducing the weight of the lens. The dimension of the compensated composite lens of FIG. 13 may be as follows:

| Example IX (12 base - modified) (FIG. 13) | |
|---|---|
| LENS DIAMETER (mm) = | 65 |
| Glass Base Curve (front surface) = | +12.81 D |
| Glass Back Curve (diopters) = | −12.47 |
| Plastic Front Curve (diopters) = | +12.25 D |
| Plastic Back Curve (diopters) = | −4.86 D |
| Glass (center) and Edge Thickness = (1.20) mm = | 0.54 mm |
| Adhesive (center) and Edge Thickness = (0.80) mm = | 0.40 mm |
| Plastic (center) and Edge Thickness = (10.06) mm = | 0.30 mm |
| Total (center) and Edge Thickness = (12.06) mm = | 1.25 mm |
| Final Power, Composite Lens = | +8.76 D |

It should be noted that the reverse taper of the adhesive layer in Example IX is desirable only for very high plus power lenses, and that the taper described above with respect to the remaining embodiments is preferred for the usual prescription or nonprescription composite lens. As illustrated in all of the foregoing examples, the front glass layer preferably is of substantially the same thickness for any base curve composite lens, so that the amount of darkening available with all base curve photochromic lenses will be the same. This allows the different base curve lenses to be interchangeable without affecting the visual qualities of the lens.

All of the foregoing examples are compensated so that the lens wholesaler or retailer can grind and polish them to desired prescriptions as though the lenses were all plastic, thus eliminating the need for individual compensation calculations.

Ophthalmic lenses having the features of the present invention as described above have been constructed and tested extensively, and examples of such tests follow.

EXAMPLE 1

A 1.0 mm thick photochromic glass lens with a +6.17 Diopter front curve and a −6.17 Diopter back curve was laminated to a stock single vision plastic lens manufactured by Sola, U.S.A., Inc., having a front spherical curve of +6.25 Diopter and a quoted net spherical power of +0.50 Diopter. The glass lens was 71 mm in diameter. The plastic lens was 75 mm in diameter. After the lamination process, the composite lens was hand edged so that the composite lens was 71 mm in diameter. The lamination adhesive used was one gram of V23-10 "GLASSCLEAR" Silicone sealant made by Perennator, North America, Inc. The two lens components were washed thoroughly prior to lamination. By application of adequate force, the two lens components were forced together, leaving an adhesive layer of only about 0.005″ between the glass and plastic layers completely around the perimeter. The laminated lens was subjected to curing in an oven set at 140° F. for 24 hours in order to cure it faster and also to cure it at elevated temperatures compared to a room temperature cure. This was done because if a laminated lens is to perform throughout the range of −40° F. to 260° F., or a 300° F. differential, the lens should be cured at a midpoint temperature of 110° F. or, more precisely, at the temperature which creates a midpoint in the mechanical expansion of the material, which is not necessarily the middle of the temperature range. The lens was subjected to 270° F. temperature immediately after cure, and it failed around the perimeter. The predicted failure was due to the 0.005" gap being too small to absorb the expansion of the plastic layer with respect to the glass layer. The plastic was measured at 27° F. to have a 0.026" increased radius (or 140 PPM/°C.), requiring the adhesive to absorb roughly 5 times the 0.005 gap in elongation to accommodate the increased radius of the plastic. The adhesive used could only produce 400% elongation, not 500%. It therefore delaminated, but it did so by cohesive bond breaking, not by adhesive breaking, nor by breaking the glass or the plastic. This test illustrated that the adhesive material alone was not a solution to the problem of delamination of a glass/plastic lens.

EXAMPLE 2

A glass photochromic lens having 1.0 mm thickness, 71 mm diameter, and a front curve of +6.17D and back curve of −6.17 Diopter was laminated to a 75 mm plastic lens made by Sola Optical, U.S.A., having a front curve of +6.50 Diopter. The layers were assembled using the same adhesives as in Example 1, namely V23-10, and forcing the two lenses together in accordance with this invention, until the adhesive gap was approximately 0.008" thick at the perimeter. The same 24 hour cure at 140° F. was used. This lens, when subjected to 270° F. for 30 minutes showed no sign of delamination nor any other defect. It was crystal clear. (The lens had been edged to 71 mm total diameter as was done in Example 1.) The same lens was then subjected to −80° F. by inserting it directly into −80° F. air for ½ an hour. While in the −80° F. temperature, the plastic component was observed to have decreased in radius approximately 0.010", i.e., a 0.020" smaller diameter. When removed from the cold chamber, the laminated lens was again found to have no visible defects of any kind. The same lens was next subjected to 212° F. boiling water for three hours and thereafter was found, once again, to have no visible defects.

EXAMPLE 3

Another laminated example was produced and treated exactly like the one in Example 2 above except that in this test, a Sola Optical, U.S.A., stock plastic lens with a steeper front spherical curve of +6.75 Diopter was used, thus creating an even larger adhesive gap around the peripheral edge of approximately 0.015". This laminated lens passed each of the extreme tests conducted in Example 2, without failure.

EXAMPLE 4

Two lenses constructed according to Example 3 were laminated with RTV-108 Silicone rubber cement in accordance with this invention and allowed to cure at room temperature for 24 hours before subjecting it to the same harsh temperatures as Example 3. It passed all of the tests with no detectable blemishes of any kind. The slight haze inherent in the RTV-108 cement made it less desirable than the crystal clear V23-10 cement of Example 3 for optical uses.

From the foregoing examples, it is seen that a true photochromic lens having the light weight of plastic and the advantages of glass has been provided, the lens being durable, strong and optically correct for use in eyeglasses. Although the invention has been shown in terms of preferred embodiments, it will be apparent to those of skill in the art that numerous modifications and variations may be made without departing from the true spirit and scope thereof as set forth in the following claims. For example, although the present invention is illustrated using a front layer of glass and a rear layer of plastic, it may in some circumstances be desirable to reverse the positions of these layers. Similarly, it may be desirable to sandwich a layer of glass between two layers of plastic or vice-versa, all of which can be accomplished using the techniques of the present invention. Multi-focal lenses may be made by adhering suitable bifocal buttons to the front surface of the composite lens; and the lenses made in accordance with the invention may be coated or tinted in accordance with conventional techniques.

Although the present invention has been described primarily in terms of ophthalmic lenses, it should be understood that the invention is not so limited, but encompasses a wide variety of optical lens applications. For example, lenses for cameras, telescopes, spectrometers, and like optical devices can be made in accordance with the present invention with the same benefits described for eyeglass applications. Further, the multiple layers of the composite lens are not limited to glass and plastic, but may include a wide variety of optical materials which may be combined for use in infrared, visible, and ultraviolet optics. These include a wide variety of optical materials having different coefficients of expansion and, which, therefore, normally cannot be laminated, but which would be highly desirable in combinations for producing, for example, improved optical characteristics such as compensated chromatic dispersion, as well as desired physical properties such as scratch resistance and protection from damage, as by solvents, acids, caustic solutions, or the like. The present invention thus allows the construction of laminated optics having combinations with characteristics not previously achievable. Thus, the true spirit and scope of the invention is limited only by the following claims.

What is claimed is:

1. A glass and plastic composite ophthalmic lens comprising:

a frontmost glass lens layer having a glass front surface and a glass ocular surface, said ocular surface having a first radius of curvature, said glass layer having a first coefficient of thermal expansion;

a plastic lens layer concentric with said glass layer and having a plastic front surface and a plastic ocular surface, said plastic front surface having a second radius of curvature and being adjacent but spaced from said glass layer ocular surface to define a narrow gap therebetween, said plastic layer having a second coefficient of thermal expansion; and an optically clear, highly cohesive and adhesive elastomeric bonding material having low tensile strength, and capable of elongation greater than 100% without destruction or permanent deformation within said gap after curing to bond said glass layer to said plastic layer, said adhesive layer having a thickness at the periphery of said gap which is determined by the difference between said first and second coefficients of thermal expansion, by the diameter of the lens, and by the maximum elongation of said elastomeric bonding material so that the elasticity of said bonding material will accommodate changes in the dimensions of said plastic layer with respect to said glass layer due to said difference between said coefficients of thermal expansion over an ambient temperature range of about 300° F. to prevent delamination of and to prevent fracture of said glass and plastic layers.

2. The composite lens of claim 1, wherein said adhesive gap is thin at the center of said lens and relatively thick at the peripheral edge thereof.

3. The composite lens of claim 1, wherein said glass layer is photochromic glass.

4. The composite lens of claim 1, wherein said elastomeric bonding material has an elongation characteristic sufficient to enable said bonding material to remain bonded to said glass layer and to said plastic layer during changes in ambient temperature.

5. The composite lens of claim 4, wherein said elastomeric material is capable of resilient elongation of about 400% after curing.

6. The composite lens of claim 4, wherein said adhesive gap is sufficiently thick at the peripheral edge of a composite lens of at least 75 mm diameter to enable said lens to withstand temperature extremes of between about −80° F. and +250° F.

7. The composite lens of claim 6, wherein said glass layer is photochromic glass.

8. The composite lens of claim 1, wherein said plastic layer is a plano lens.

9. The composite lens of claim 8, wherein said plastic layer is a semifinished plastic lens.

10. The composite lens of claim 1, wherein said plastic layer is a semifinished plastic lens.

11. The composite lens of claim 1, wherein said glass layer, plastic layer, and elastomeric bonding material each have a different index of refraction.

12. The composite lens of claim 11, wherein said glass layer is a glass lens having a power sufficient to compensate said composite lens for optical variations caused by said different indices of refraction.

13. The composite lens of claim 1, wherein said elastomeric bonding material within said adhesive gap acts as a lens component having a power, and wherein said glass layer is a glass lens having a power sufficient to compensate said composite lens for the power of said elastomeric bonding material.

14. The composite lens of claim 13, wherein said glass layer, plastic layer, and elastomeric bonding material each have a different index of refraction.

15. The composite lens of claim 14, wherein said glass lens further has a power sufficient to compensate said composite lens for said different indices of refraction.

16. The composite lens of claim 15, wherein said plastic layer is a semifinished lens, and wherein said power of said glass lens compensates said composite lens to enable said composite lens to be finished to prescription as though it were an all-plastic lens.

17. The lens of claim 1, wherein said first radius of curvature equals said second radius of curvature, whereby said gap is of uniform thickness across the diameter of the lens.

18. The lens of claim 17, wherein the thickness of said adhesive layer at the periphery of said gap is between about 0.3 and 0.5 mm for a lens having a maximum dimension of about 70 mm.

19. The lens of claim 1, wherein said first and second radii of curvature are different, whereby said gap is tapered.

20. Thee lens of claim 19 wherein the thickness of said adhesive layer at the periphery of said gap is between about 0.3 and 0.5 mm for a lens blank having maximum dimension of about 70 mm.

21. The lens of claim 20, wherein said gap tapers continuously from a minimum value at the center of the lens blank to a maximum value at the periphery of the lens blank.

22. The lens of claim 21, wherein said gap has a minimum thickness at the geometrical center of the lens blank of less than 0.1 mm.

23. The lens of claim 20, wherein said gap tapers continuously from a minimum value at its periphery to a maximum value at the center of said lens blank.

24. The lens of claim 1, wherein said bonding material has sufficient elasticity to permit an elongation of at least 400% without permanent deformation.

25. The lens of claim 1, further including a thin optical filter layer within said adhesive layer and spaced from said glass and plastic layers.

26. The lens blank of claim 25, wherein said optical filter layer is a polarizing film.

27. The lens of claim 25, wherein said optical filter is an ultraviolet filter.

28. An improved semifinished photochromic ophthalmic composite lens compising:
  a thin photochromic glass lens element finished on both its front surface and its ocular surface, said glass lens element having a first coefficient of thermal expansion;
  a semifinished optically clear plastic lens element finished on its front surface to a curvature different than the curvature of said glass lens element ocular surface and unfinished on its ocular surface, said glass lens element being concentric with and spaced from the front surface of said plastic lens element to define a tapered gap therebetween, said plastic lens element having a second coefficient of thermal expansion; and
  an optically clear elastomeric bonding material within said tapered gap to bond the ocular surface of said glass lens element to the front surface of said plastic lens element, said bonding material being highly elastic and having a thickness at the perphery of the composite lens which is sufficient to enable the elasticity of the bonding material to accommodate changes in the diameter of said plastic lens element with respect to said glass lens element due to the difference between said first and second coefficients of thermal expansion over a temperature range of more than 300° F. to thereby prevent delamination of, and to prevent fracture of, said glass and plastic lens elements due to changes in ambient temperature.

29. The photochromic lens of claim 28, wherein said elastomeric bonding material is an elastic permanently elastic polymeric silicone adhesive.

30. The photochromic composite lens of claim 28, wherein said elastomeric bonding material is a flexible, resilient, non-toxic material having an elongation characteristic of about 400% after curing.

31. The photochromic composite lens of claim 28, wherein said elastomeric bonding material is a one part silicone adhesive.

32. The photochromic composite lens of claim 28, wherein said elastomeric bonding material comprises polymethylphenylsyloxane plus silicone dioxide and acetoxysilane as a cross-linker, with a 0.02% tin catalyst.

33. The photochromic composite lens of claim 28, wherein said glass lens has a power sufficient to compensate the composite lens for power variations caused by the shape of the bonding material within said tapered gap and to compensate the composite lens for differences in the indices of refraction of said glass lens, said plastic lens and said elastomeric bonding material.

34. A composite optical lens, comprising:
- a first, frontmost, glass layer having a first front surface and a first rear surface, said rear surface having a first radius of curvature;
- a second plastic layer adjacent and concentric with said first layer and having a second front surface and a second rear surface, said second front surface being spaced from said first rear surface to define therebetween an adhesive gap, said first and second layers having substantially different coefficients of thermal expansion; and
- an optically clear, highly cohesive and adhesive elastomeric bonding material having a substantial thickness within said adhesive gap to bond said first layer to said second layer, said bonding material being sufficiently thick between the peripheral edges of said first and second layers to enable the elasticity of the bonding material to accommodate differences in the thermal expansion of said layers when subjected to a wide range of ambient temmperatures to prevent delamination of and to prevent fracture of, said first and second layers due to temperature changes.

35. The composite optical lens of claim 34, wherein said second front surface has substantially the same radius of curvature as said first rear surface, whereby said adhesive gap has substantially the same thickness from the center of said lens to the peripheral edge thereof.

36. The composite optical lens of claim 34, wherein said second front surface has a different radius of curvature than said first rear surface, whereby said adhesive gap is tapered between the center of the lens and the peripheral edge thereof.

37. The composite optical lens of claim 36, wherein said adhesive gap is relatively thinner at the peripheral edge than at the center thereof.

38. The composite optical lens of claim 36, wherein said adhesive gap is relatively thicker at the peripheral edge than at the center thereof.

39. The composite optical lens of claim 38, wherein said first front surface has a radius of curvature different than that of said first rear surface to provide an optical power to said first layer, said optical power being selected to compensate said composite lens for the optical power of said tapered bonding material and for differences in the indices of refraction of said first and second layers and said bonding material.

40. The composite optical lens of claim 39, wherein said first layer is of optical glass having photochromic characteristics and said second layer is of optical plastic.

41. The composite optical lens of claim 40, wherein said second layer is semifinished optical plastic lens blank.

42. The composite optical lens of claim 41 wherein said first layer has a center thickness of about 1.0 mm and said bonding material has a thickness at the axial center of said lens of about 0.1 mm.

43. The composite optical lens of claim 42, wherein said bonding material tapers from a center thickness of about 0.1 mm to a peripheral edge thickness of about 0.3 mm for a lens having a diameter of about 70 mm to accommodate thermal expansion through a temperature range of about 300° F.

44. The method of forming a composite ophthalmic lens, comprising:
- providing a semifinished plastic lens element having an unfinished ocular surface and a finished front surface, said front surface having a first radius of curvature;
- providing a finsihed glass lens element having a finished front surface and a finished ocular surface, and having the same diameter as said plastic lens element, said ocular surface having a second radius of curvature;
- dispensing on said glass lens element ocular surface a predetermined quantity of an uncured, optically clear elastomeric material;
- aligning said plastic and glass lens elements to be concentric with each other;
- pressing said glass lens element with said elastomeric mateiral onto said plastic lens element finished front surface to distribute said elastomeric material uniformly throughout the gap between said glass and plastic lens elements to produce an intermediate layer having a minimum peripheral thickness of about 0.3 mm sufficient to accommodate the differences in thermal expansion between said glass and plastic elements; and
- air curing said elastomeric material.

45. The method of claim 44, wherein said adhesive is cured at a temperatue above room temperature to produce, after curing, a slight stress in said adhesive layer at room temperature due to the different thermal expansion characteristics of said glass and plastic elements.

46. The method of claim 45, further including moving said glass and plastic elements with respect to each other in a repetitive circular path while pressing said glass lens element onto said elastomeric material to dissipate gas bubbles in said elastomeric material.

* * * * *

UNITED STATES PATENT AND TRADEMARK OFFICE
CERTIFICATE OF CORRECTION

PATENT NO. : 4,679,918
DATED : July 14, 1987
INVENTOR(S) : Ronald S. Ace

It is certified that error appears in the above-identified patent and that said Letters Patent is hereby corrected as shown below:

Claim 20, column 25, line 65, "Thee" should be --The--.

Claim 30, column 26, line 55, delete "a" and substitute therefor --an elastic--.

Claim 34, column 27, line 24, "temmperature" should be --temperature--.

Signed and Sealed this

Twenty-fourth Day of November, 1987

Attest:

DONALD J. QUIGG

Attesting Officer

Commissioner of Patents and Trademarks